US011770413B2

(12) United States Patent
Mehata et al.

(10) Patent No.: US 11,770,413 B2
(45) Date of Patent: Sep. 26, 2023

(54) DOMAIN-INDEPENDENT RESOURCE SECURITY AND MANAGEMENT

(71) Applicant: Palo Alto Networks, Inc., Santa Clara, CA (US)

(72) Inventors: Angad Abhay Mehata, Milpitas, CA (US); Chandra Biksheswaran Mouleeswaran, Cupertino, CA (US); Varun Badhwar, Los Altos Hills, CA (US); Wayne Jens Jensen, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 243 days.

(21) Appl. No.: 17/222,039

(22) Filed: Apr. 5, 2021

(65) Prior Publication Data

US 2022/0321603 A1 Oct. 6, 2022

(51) Int. Cl.
*H04L 9/40* (2022.01)
*G06F 16/28* (2019.01)
*G06F 9/451* (2018.01)

(52) U.S. Cl.
CPC .............. *H04L 63/20* (2013.01); *G06F 9/451* (2018.02); *G06F 16/285* (2019.01)

(58) Field of Classification Search
None
See application file for complete search history.

(56) References Cited

U.S. PATENT DOCUMENTS

| 8,577,823 | B1* | 11/2013 | Gadir | G06N 5/025 |
| | | | | 706/45 |
| 2017/0033997 | A1* | 2/2017 | Burk | H04L 47/827 |
| 2020/0137097 | A1* | 4/2020 | Zimmermann | G06F 21/6218 |

OTHER PUBLICATIONS

Zhu, et al., "Querying Combined Cloud-Based and Relational Databases", 2011 International Conference on Cloud and Service Computing, Hong Kong, 2011, 6 pages.

* cited by examiner

*Primary Examiner* — Cai Y Chen
(74) *Attorney, Agent, or Firm* — GILLIAM IP PLLC

(57) ABSTRACT

A resource database which stores structured data describing resources from a diverse array of origins (e.g., an application or cloud environment) is built and maintained to support querying, policy enforcement, and remediation of resources from any origin. Structured data representing resources are obtained from any origin for insertion and categorized based on their type and/or origin. Resources within a category have a shared set of potential object paths as defined by the hierarchical tree structure of their structured data. Resources may be correlated across categories based on having values at different object paths in common. Queries and rules/policies can thus reference resources of any category and also resources across different categories based on correlations between the resources, thereby extending rule/policy enforcement and incident remediation across multiple different origins of resources.

20 Claims, 9 Drawing Sheets

DOMAIN-INDEPENDENT RESOURCE SECURITY AND MANAGEMENT

BACKGROUND

The disclosure generally relates to digital data processing and to information retrieval, database structures therefore, and file system structures therefore.

As the trend towards cloud computing grows, an increasing number of cloud security and management platforms have become available. These platforms facilitate securing, monitoring, and managing cloud resources running in a cloud native environment. Cloud resources deployed in cloud environments that can be managed with such platforms are commonly represented with structured data, such as with JavaScript Object Notation (JSON). JSON files have a hierarchical tree structure, where sub-nodes or elements are denoted with a colon and pair of curly brackets which follow an element identifier.

BRIEF DESCRIPTION OF THE DRAWINGS

Embodiments of the disclosure may be better understood by referencing the accompanying drawings.

DESCRIPTION

Figure 1:
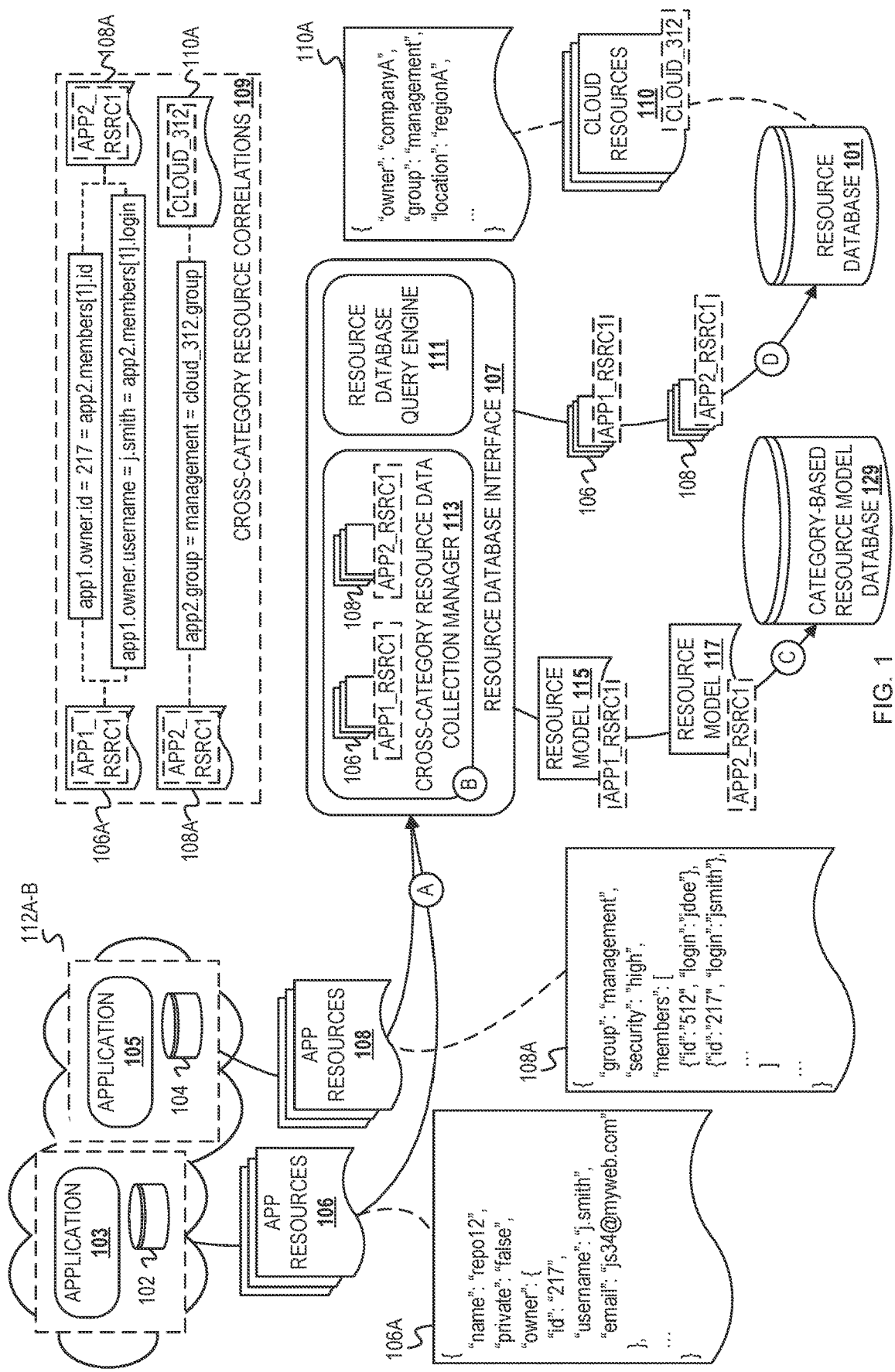
FIG. 1 depicts a conceptual diagram of building and maintaining a resource database storing resources from a diverse array of origins to facilitate management and security of resources across multiple origins.

The description that follows includes example systems, methods, techniques, and program flows that embody aspects of the disclosure. However, it is understood that this disclosure may be practiced without these specific details. For instance, this disclosure refers to structured data represented with JSON in illustrative examples. Aspects of this disclosure can be instead applied to structured data represented with other schemas or formats. In other instances, well-known instruction instances, protocols, structures and techniques have not been shown in detail in order not to obfuscate the description.

Overview

Functionality provided by cloud security platforms, including investigating resources, creating policies for resources, generating alerts for policy violations, and subsequent remediation or response, conventionally operate on cloud resources running in a cloud environment, where cloud resources can be represented as structured data (e.g., with JSON files). Platforms for application security similarly provide techniques for application resource management but are limited in scope to application resources, with a similar issue in place with existing solutions for data visualization and searching. The functionality of a cloud platform can be extended beyond security for cloud resources and made available to other resources or other structured data that originate from a diverse array of sources and across a variety of domains as described herein, thereby allowing for remediation of events for both cloud and application resources as well as correlation of data across a variety of sources. Resources can thus be secured and monitored, and associated events remediated whether the resources originated from a cloud environment, an application, or from a customer's own data store, providing for a security platform with a diversified set of potential uses.

A database interface which interfaces with a cloud database storing cloud resources can also interface with a resource database storing resources of applications, including Software-as-a-Service (SaaS) and on-premise applications, represented as structured data having a same format as the cloud resources. A resource can be any asset of an origin, such as a cloud environment or application, that is represented with structured data. The resource database is built and maintained by obtaining structured data representing resources from any origin for insertion into the resource database. The structured data can be obtained through submission of requests to the application or other origin of the structured data via an application programming interface (API) of the origin or can be obtained from input. The obtained resources are categorized based on type and/or origin, such as the application from which the structured data of the resources originated, such that resources within a category have a shared set of potential object paths as defined by the hierarchical tree structure of the associated structured data. Although resources across categories may have different sets of field-value pairs and thus different sets of potential object paths, resources may be correlated across categories based on having values at different object paths in common. Queries submitted to the resource database or rules/policies to be enforced on resources stored therein can thus reference one or more different categories and may also span origins of the resources to provide a comprehensive solution for investigating, securing, or otherwise managing resources across a variety of categories.

Example Illustrations

FIG. 1 depicts a conceptual diagram of building and maintaining a resource database storing resources from a diverse array of origins to facilitate management and security of resources across multiple origins. As used herein, a "resource" refers to an asset of an application, a cloud resource provided by a cloud service provider, or any other asset associated with or owned by its origin and represented with structured data. A resource database interface ("database interface") 107 provides an interface by which a resource database 101 can be accessed. For instance, the database interface 107 can provide an interface for insertion or updating of resources in the resource database 101, submission of queries to the resource database 101, etc. The database interface 107 includes a cross-category resource data collection manager ("collection manager") 113 and a resource database query engine ("query engine") 111. The resource database 101 maintains structured data which represent resources, also referred to herein as resource data, which can originate from multiple sources. Resource data maintained in the resource database 101 should be of a same format for structured data, depicted as JSON in this example.

While the database interface 107 is depicted and referred to as interfacing with the resource database 101 for simplicity, the database interface 107 can be implemented to interface with more than one database in which resource data are maintained. For instance, cloud resource data may be stored in a database(s) maintained by a cloud service provider, such as a cloud database that is an external database provided as a SaaS database which maintains cloud data across a variety of severs, locations, etc. The database interface 107 can thus interface with the cloud database via an API of the cloud service provider in addition to the resource database 101 which stores application resource data via an API which it exposes.

In this example, cloud resources 110 which comprise a plurality of JSON files have already been inserted into the resource database 101. The cloud resources 110 may be data associated with hardware or software cloud resources which have been deployed in a cloud environment, where the originating cloud environment is depicted as having an identifier of 312. FIG. 1 also depicts an application 103 and an application 105 (collectively the "applications 103, 105"). The application 103 and/or application 105 are SaaS applications that are hosted in cloud environments 112A-B, although in other examples, the application 103 and/or application 105 can be hosted on premise. The application 103 has an associated data store 102, and the application 105 has an associated data store 104.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the database interface 107 obtains resource data for resources of the applications 103, 105. Retrieval of resource data may be triggered by a customer or user of each of the applications 103, 105 linking a respective account with a security platform which manages investigation, monitoring, etc. for resources stored in the resource database 101 and of which the resource database and database interface 107 are part. The database interface 107 obtains application resources 106 of the application 103 that may correspond to one or more resources of a same type. The database interface 107 also obtains application resources 108 of the application 105 that may correspond to one or more resources of the same type. The application resources 106 and application resources 108 (collectively the "application resources 106, 108") in this example are each a plurality of JSON files, where each JSON file comprises data which represent a corresponding resource. The database interface 107 can obtain the application resources 106, 108 by issuing a request to each of the applications 103, 105 and/or data stores 102, 104 via an API exposed by the respective one of the applications 103, 105 and/or data stores 102, 104. Originating applications or other entities from which the database interface 107 obtains resource data are referred to herein as the origins of the corresponding resources.

FIG. 1 depicts a first of each of the application resources 106, 108 and cloud resources 110 as application resource 106A, application resource 108A, and cloud resource 110A, respectively. The application resource 106A may correspond to a repository and includes values of "repo2" and "false" for the fields "name" and "private," respectively, along with field-value pairs denoting owner information. The application resource 108A may correspond to a directory and includes values of "management" and "high" for fields of "group" and "security," respectively, along with field-value pairs for identifier and login information for members of the group. The cloud resource 110A indicates that the corresponding cloud resource is owned by an entity named "companyA," is associated with a group named "management," and is located in a region named "regionA."

At stage B, the collection manager 113 of the database interface 107 determines a category of the application resources 106, 108. The collection manager 113 can determine categories to which application resources belong or should be assigned based on their origins and/or a type of the resource. For instance, a category to which one or more resources belong can correspond to the origin of the resources, a type of resources obtained from an origin, etc. Resources are categorized such that JSON files representative thereof which belong to a same category have a set of possible JSON object paths in common, where JSON object paths specify a path to a leaf in the tree structure of the respective JSON file and a type of the value to which the leaf corresponds (e.g., string, Boolean, number, etc.). As an example, the JSON object paths associated with the "owner" field of the application resource 106A are "owner.id":"integer," "owner.username":"string," and "owner.email": "string." To determine how to categorize the application resources 106, 108, the collection manager 113 can determine an identifier associated with each of the application resources 106, 108 which identifies the respective one of the applications 103, 105 and/or a type of each of the resources and categorize the resources with other resources having the determined identifier(s) in common. The identifier(s) based on which the collection manager 113 determines to correspond to the application resources 106, 108 may have been provided at the time of retrieval of the resources, such as in a response to the query(ies) or request(s) to obtain the resources issued by the database interface 107.

The collection manager 113 determines that the application resources 106 originated from the application 103 (e.g., based on an identifier associated with the application resources 106) and associates the application resources 106 with a category named "app1_rsrc1." The collection manager 113 also determines that the application resources 108 originated from the application 105 and associates the application resources 108 with a category named "app2_rsrc1." The application resources 106, 108 can be categorized into their respective one of the categories of "app1_rsrc1" and "app2_rsrc1" based on the collection manager 113 associating a label, tag, etc. that denotes the category with each of the application resources 106, 108 (e.g., with each JSON file).

At stage C, the collection manager 113 generates a resource model 115 and a resource model 117 (collectively the "resource models 115, 117") based on the application resources 106 and application resources 108, respectively. The resource model 115 indicates the set of JSON object paths which may be present in JSON files for resources within the category "app1_rsrc1" and includes the following JSON object paths:
"name": "string"
"private": "Boolean"
"owner.id": "integer"
"owner.username": "string"
"owner.email": "string"
Similarly, the resource model 117 indicates the set of JSON object paths which may be present in JSON file representations of resources categorized as "app2_rsrc1" resources and includes the following JSON object paths:
"group": "string"
"security": "string"
"members.[*].id": "integer"
"members.[*].login": "string"
The collection manager 113 can determine the resource models 115, 117 by determining the JSON object paths included in the application resources or a subset thereof within the categories "app1_rsrc1" and "app2_rsrc1, respectively, based on parsing the associated JSON object files. The collection manager 113 may deduplicate the determined JSON object paths and generate the corresponding one of the resource models 115, 117 based on the deduplicated JSON object paths. The collection manager 113 can then insert the resource models 115, 117 into a category-based resource model database ("model database 129"). Each application resource subsequently assigned to the category "app1_rsrc1" will include at least a subset of the JSON object paths included in the resource model 115 in their respective JSON files, and each of the application resources categorized as "app2_rsrc1" resources will include at least a subset of the JSON object paths included in the resource model 117 in their respective JSON files. The resource models 115, 117 may be used downstream, such as for guided construction of resource queries. The resource models 115, 117 may also be utilized during subsequent collection and categorization events for resources of the applications 103, 105. For instance, upon collection of JSON files representing resources of the application 103 having a same type as the application resources 106, the collection manager 113 may determine a set of JSON object paths of the JSON files and categorize the JSON files in the category "app1_rsrc1" based on determining that the set of JSON object paths corresponds to the JSON object paths included in the resource model 115.

At stage D, the application resources 106, 108 are inserted into the resource database 101 via the database interface 107. For instance, the database interface 107 can generate a request to insert the application resources 106, 108 and submit the request to the resource database 101 via an API exposed by the resource database 101. Entries in the resource database 101 created for the application resources 106, 108 may be indexed by or labelled based on resource category. In some implementations, although not depicted in FIG. 1, the database interface 107 and resource database 101 can be part of a cloud security platform which manages and secures cloud resources, such as the cloud resources 110. Upon insertion of the application resources 106, 108 into the resource database 101 which have been categorized by origin, the capabilities of the cloud security platform including rule/policy creation and enforcement and incident remediation can be made available to resources across different categories, thereby extending the functionality offered by the security platform to the application resources 106, 108 in addition to the cloud resources 110.

Resources originating from different cloud environments, applications, etc. and thus categorized into different categories by the collection manager 113 can be correlated based on having values in common. Two or more resources which belong to two or more respective categories can be considered to be correlated if JSON object paths corresponding to each of the resources have a value in common despite the definitions of the JSON object paths being different across categories. Cross-category resource correlations ("correlations") 109 illustrate such correlations among the application resources 106, application resources 108, and cloud resources 110 based on the exemplary JSON files depicted for the application resource 106A, application resource 108A, and cloud resource 110A. As indicated by the correlations 109, the application resource 106A and application resource 108A are correlated based on the values "j.smith" and "217." The value "jsmith" is present at the leaves specified by the JSON object path "owner.username": "string" of the application resource 106A and the JSON object path "members[*].login":"string" of the application resource 108A. The value "217" is present at the leaves specified by both the JSON object path "owner.id":"integer" of the application resource 106A and the JSON object path "members[*].id":"integer" of the application resource 108A. The correlations 109 also indicate that the application resource 108A and cloud resource 110A are correlated based on the value "management," which is present at the leaves specified by both the JSON object path "group":"string" of the application resource 108A and the JSON object path "group":"string" of the cloud resource 110A. After acquiring resource data from a diverse array of origins and inserting the resource data into the resource database 101 as described in reference to FIG. 1, resource queries and policies which span multiple categories of resources can be written based on the correlations between resources across different categories. An example of cross-category querying of resources is described in reference to FIG. 2.

Figure 2:
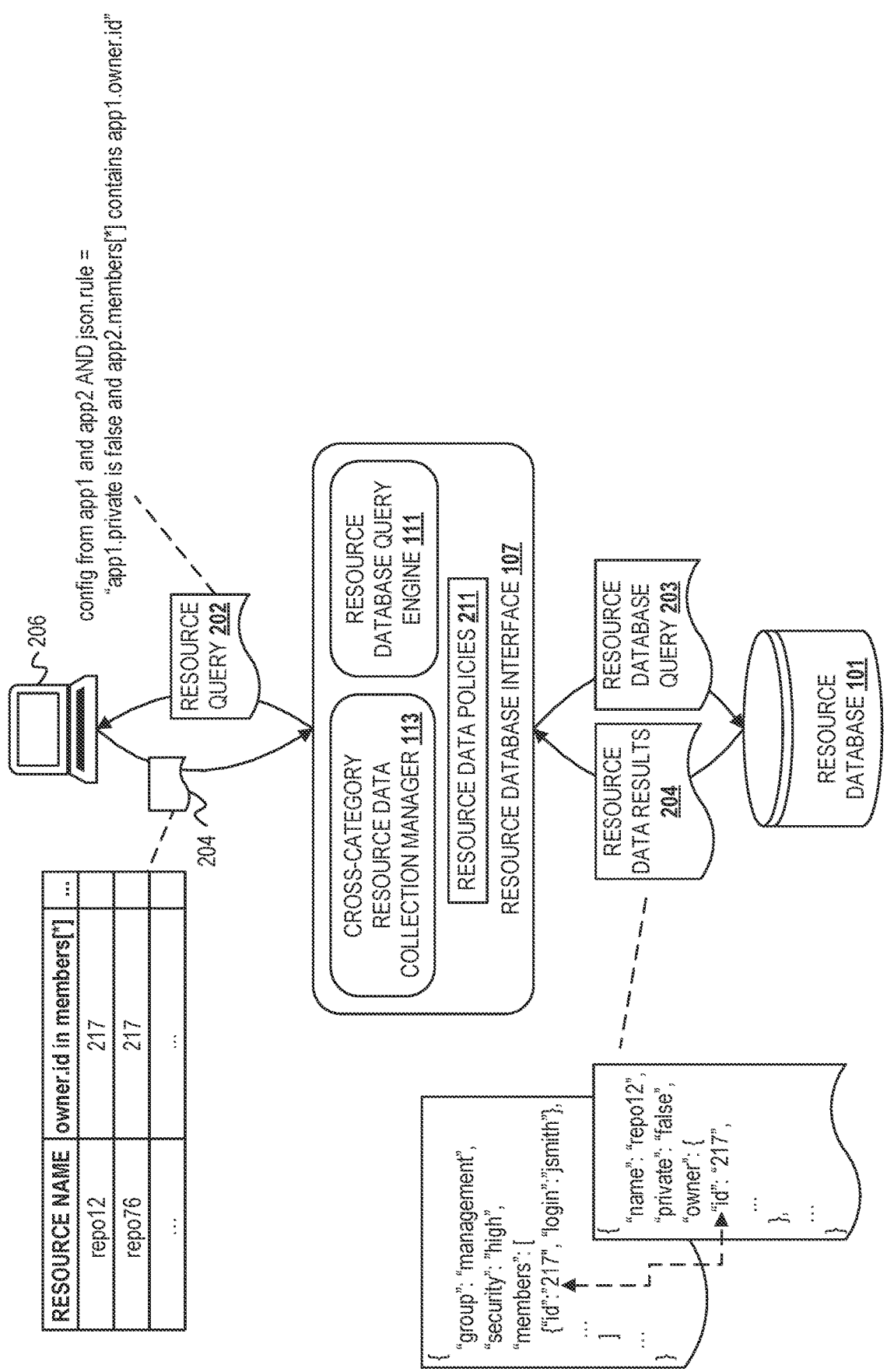
FIG. 2 depicts a conceptual diagram of querying a resource database which maintains multiple categories of resources for management and security of resources across categories.

FIG. 2 depicts a conceptual diagram of querying a resource database which maintains multiple categories of resources for management and security of resources across categories. FIG. 2 depicts the database interface 107 and the resource database 101 which stores structured data, which are JSON files in this example, that represent resources or other assets having different origins and which have been categorized accordingly as described in reference to FIG. 1. The database interface 107 in this example has attached resource data policies ("policies" 211) against which resource data are evaluated, such as based on periodic scanning of resource data stored in the resource database 101 and/or evaluation of resource data obtained for insertion into the resource database, for example.

The database interface 107 receives a resource query 202 from a computing device 206. Generation and submission of resource queries such as the resource query 202 to the database interface 107 can be performed by a user or may be automated. The resource query 202, which references resources in the categories "app1" and "app2" and is reproduced below, is a query for retrieval of indications of public repositories for which the owner ID of the repository is included in an array of members of a group known to be high security:
config from app1.resource and app2.resource AND json.rule="app1.private is false and app2.members[*] contains app1.owner.id"

The resource query 202 checks for values at the JSON object paths "private": "Boolean" and "owner.id": "integer" for resources belonging to a category named "app1" and checks for values at the JSON object path "members[*].id": "integer" for resources belonging to a category named "app2." The resource query 202 thus checks for values at JSON object paths that are associated with different resource categories and is thus a cross-category resource query.

The query engine 111 of the database interface 107 parses the resource query 202 to generate a resource database query 203 for submission to the resource database 101. The query engine 111 can generate the resource database query 203 based on the resource query 202 so that multiple categories of resources can be queried upon submission to the resource database 101. For instance, the query engine 111 can determine that the resource query indicates multiple categories of resources based on the parsing and thus may treat the resource query 202 similar to a join query. The resource database query 203 is then submitted to the resource database 101 and results 204 are retrieved by the database interface 107. The results 204 include correlated resource data that indicate correlations between the resources which satisfied the resource database query 203 based on values in common between the resources as a result of the resource query 202 being a cross-category resource query. The correlated resource data included in the results 204 indicate the common value(s) at different JSON object paths by which the resources belonging to the categories "app1" and "app2" which satisfied the query are correlated. In this example, the correlated resource data in the results 204 indicate the correlations between the values at the JSON object paths "owner.id": "integer" for "app1" resources and "members[*].id": "integer" for "app2" resources.

The database interface 107 indicates the results 204 which comprise the resources which satisfied the JSON rule indicated in the resource query 202 and any correlations between resource data across the categories "app1" and "app2." Indicating the results 204 can include communicating the results 204 to the computing device 206, generating/presenting a report or notification, etc. The results 204 can indicate the categories of resources which satisfied the resource query 202, where the resources may be associated based on the correlations indicated in the results 204. For instance, correlations between or among resources can be indicated in the results 204 which are indicated by the database interface 107 at least partially amalgamating the data included in JSON files of resources belonging to different categories and initially returned in the results 204 based on the value(s) by which the resources were correlated. In this example, the results 204 indicate the value at the JSON object path "owner.id": "integer" for resources belonging to the "app1" category and the JSON object path "members[*].id": "integer" for resources belonging to the "app2" category by which these resources were correlated. The results 204 thus indicate resource data from multiple origins, which in this case are applications. Although not depicted in FIG. 2, any of the resources indicated in the results 204 can be further investigated/monitored based on inclusion of a policy in the resource data policies 211 which specifies the resource(s) or a JSON rule associated with the resource(s), thus facilitating policy enforcement on resources regardless of their origin. An example of policy enforcement for resources of any category is described in reference to FIG. 3.

Figure 3:
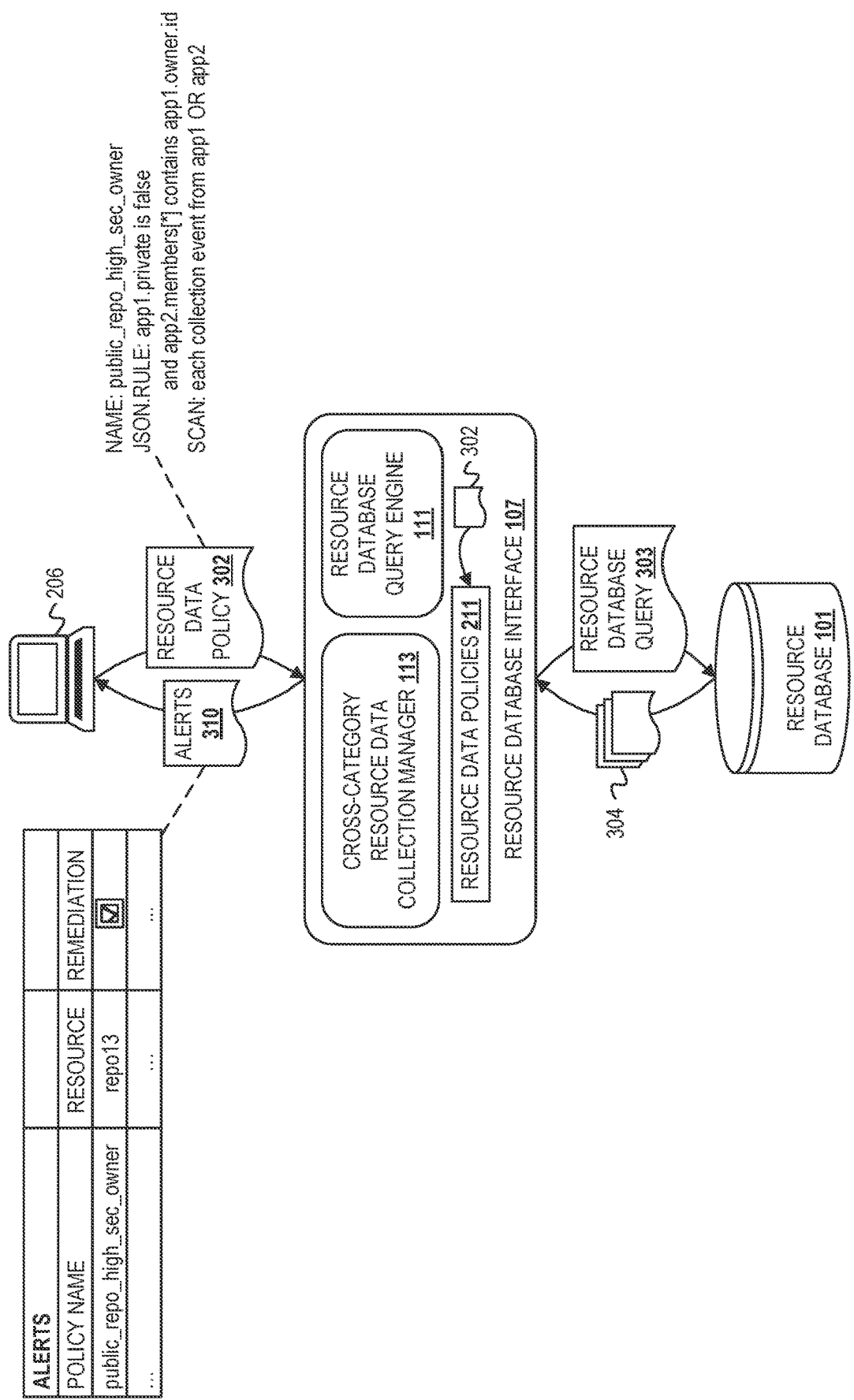
FIG. 3 depicts a conceptual diagram for enforcing policies on resources spanning one or more categories and stored in a resource database.

FIG. 3 depicts a conceptual diagram for enforcing policies on resources spanning one or more categories and stored in a resource database. FIG. 3 depicts the resource database 101 after insertion and categorization of resource data across categories. A resource data policy ("policy") 302 is created and communicated to the database interface 107 (e.g., from the computing device 206). The policy 302 comprises a name of the policy and a JSON rule to be enforced, which is the same JSON rule depicted in FIG. 2 (i.e., a rule for identifying public repositories having an owner that is a member of a group that is high security). Creation of the policy 302 which indicates the JSON rule results in generation of an alert upon identifying a public repository having an owner that is associated with a high security group. The policy 302 also comprises a scanning condition denoting that resource data stored in the resource database 101 should be scanned for evaluation against the JSON rule upon each collection event of resources categorized as "app1" or "app2." The resource database interface 107 adds the policy 302 to the resource data policies 211.

Later, upon the collection of resources categorized as "app1" and/or "app2" satisfying the scanning condition indicated in the policy 302 and triggering evaluation of JSON files against the corresponding JSON rule, the database interface 107 queries the resource database 101 for JSON files which satisfy the JSON rule indicated in the policy 302. Querying the resource database 101 can include generating a query such as resource database query 303 for submission to the resource database 101, where the resource database query 303 indicates the JSON rule indicated in the policy 302. The resource database query 303 may also include any pertinent join rules in the case of JSON rules spanning multiple resource categories. The database interface 107 obtains results 304 which comprise indications of resources satisfying the JSON rule indicated in the policy 302.

The database interface 107 generates alerts 310 based on obtaining the results 304. The alerts 310 may be indicated or communicated to the computing device 206. The alerts 310 designate the policy name and the resource(s) identified in the results 304. In particular, the alerts 310 include an alert for the name of the policy 302, or "public_repo_high_sec_owner," and an indication of a resource named "repo13" for which the associated JSON file included data which satisfied the JSON rule indicated in the policy 302. The alerts 310 also include an option for remediation of resources which satisfied the policy. Remediation of resources which satisfy policies allows for resolving issues or events involving resources identified from evaluation of resource data stored in the resource database 101 based on the resource data policies 211. For example, the remediation action associated with the resource "repo13" may be changing the privacy of the associated repository from public to private. Policy enforcement for resources stored the resource database 101 thus provides for enforcing policies on resources across multiple categories, such as resources originating from multiple different applications and/or cloud environments, so that policy enforcement and any associated remediation are not limited to resources of a single origin.

Figure 4:
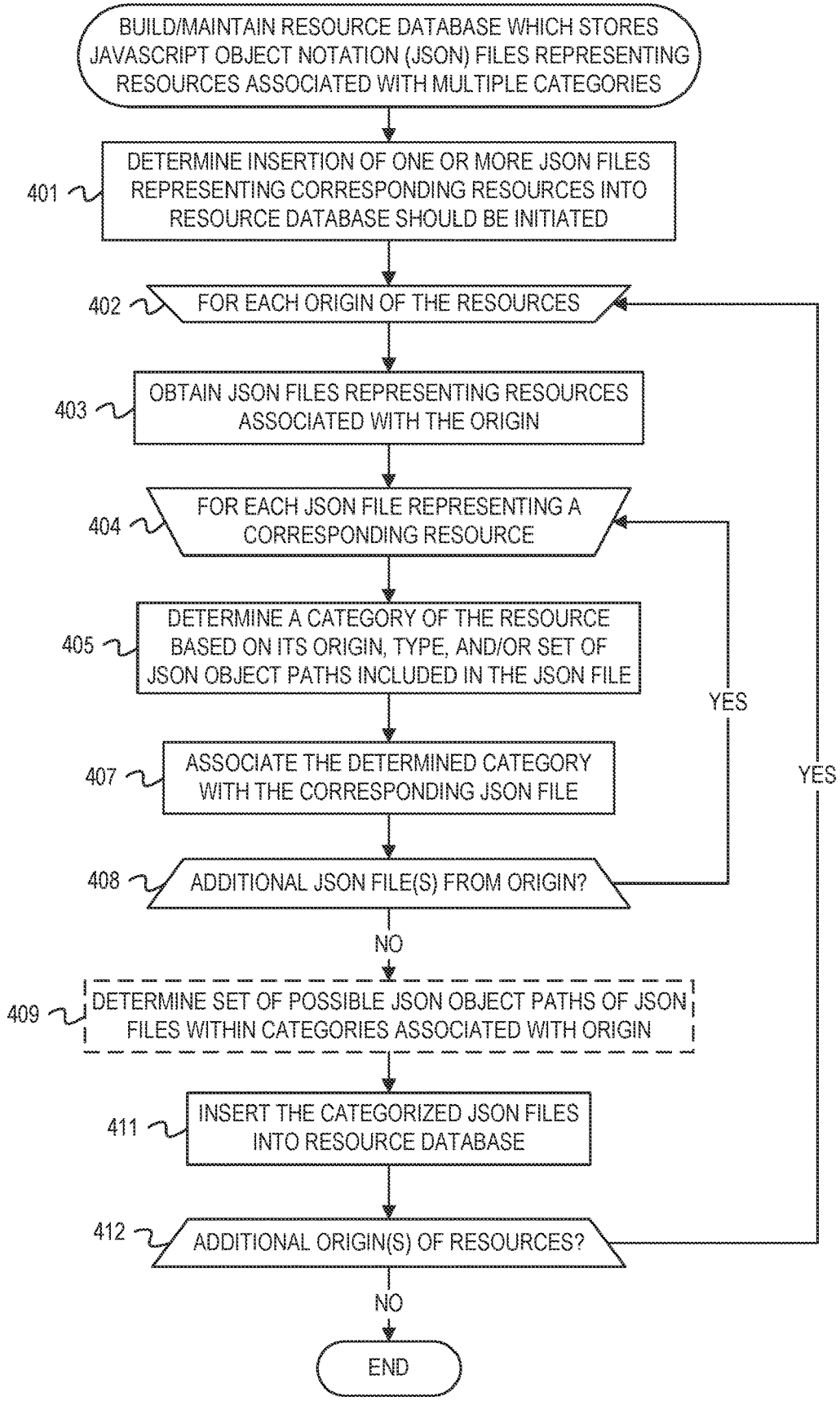
FIG. 4 is a flowchart of example operations for building/maintaining a resource database which stores JSON files representing resources associated with multiple different categories.
Figure 5:
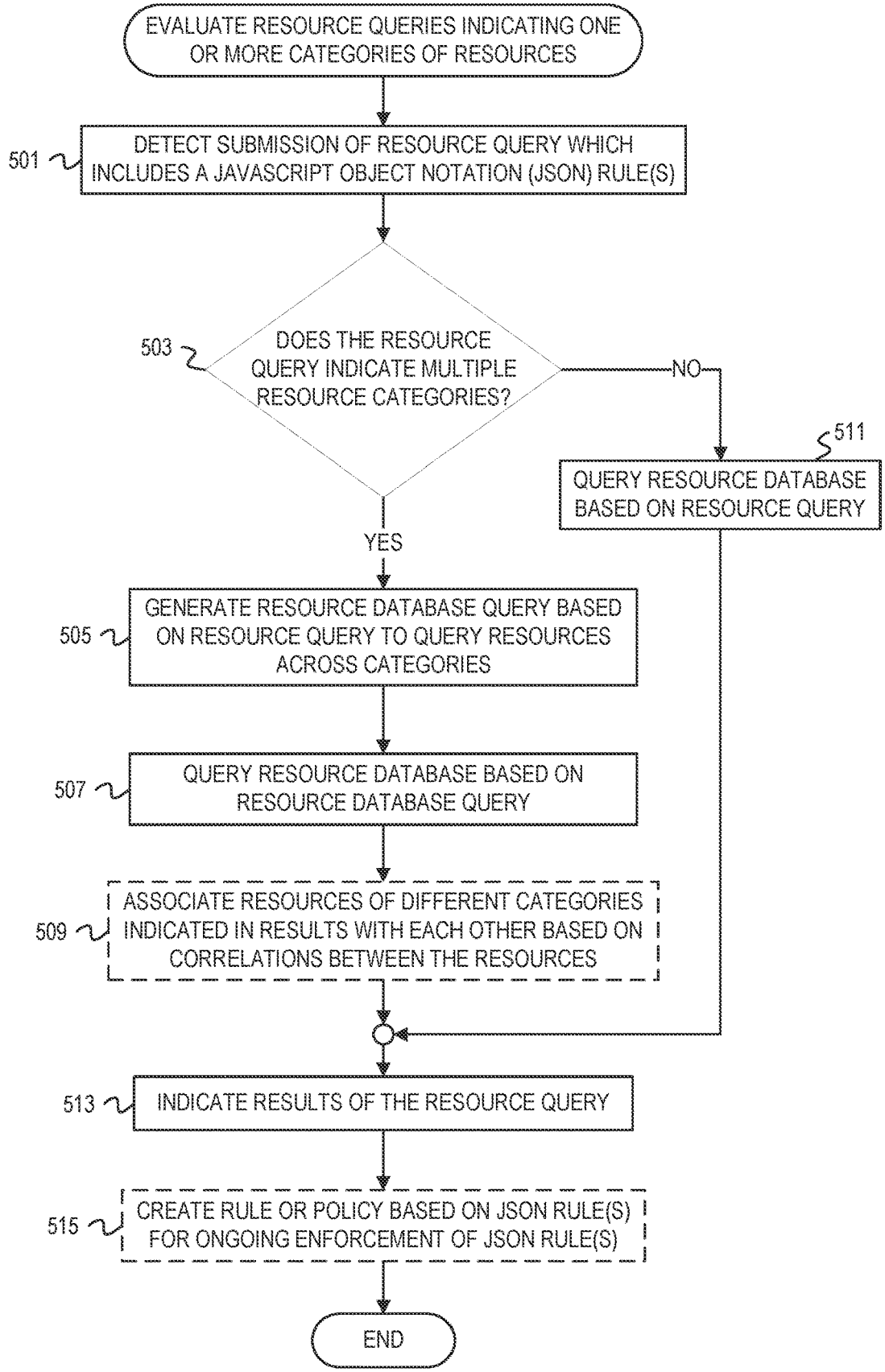
FIG. 5 is a flowchart of example operations for evaluating resource queries indicating one or more categories of resources.

FIGS. 4 and 5 depict flowcharts of example operations for domain-independent resource security and management. The domain-independent resource security and management may be achieved through architectural reuse of a cloud security platform, for example. The example operations are described with reference to either a resource database interface ("database interface"), a cross-category resource data collection manager ("collection manager"), or a resource database query engine ("query engine") for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. Further, some of the blocks in FIGS. 4 and 5 are depicted with dashed lines. Such blocks represent examples of operations that can be optionally performed, such as configurable settings of the database interface, collection manager, or query engine or operations which may be performed intermittently. However, this depiction of the blocks should not be interpreted as the operations in the blocks depicted with solid lines being required operations.

FIG. 4 is a flowchart of example operations for building/maintaining a resource database which stores JSON files representing resources associated with multiple different categories. The resource database can be a database which stores JSON files or other structured data representing resources across a variety of origins. An origin of a resource refers to the application, cloud environment, etc. from which the JSON file(s) representing the resource was obtained or which maintains/owns the resource. In some implementations, the resource database may be part of a security platform, such as a cloud security platform which can be extended to secure and manage non-cloud resources (e.g., application resources) as described herein.

At block 401, the collection manager determines that insertion of one or more JSON files representing corresponding resources into a resource database should be initiated. The resources represented by the JSON files to be inserted are associated with one or more origins. The determination that insertion of JSON files into the resource database should be initiated can be made based on a first of one or more triggers being detected. Triggers can include the linking of an application(s) or cloud account(s) with a platform which includes the collection manager, detecting input into an interface presented for insertion of resource data (e.g., via a webhook), etc. Collection of resource data from sources which have already been linked can also be intermittent, where the trigger corresponds to detection that a configurable interval of time which triggers a collection/insertion event has elapsed.

At block 402, the collection manager begins iterating through each origin of resources which are to be inserted into the resource database. The collection manager can obtain and process JSON files to be inserted on a per-origin basis; that is, the operations depicted at each iteration are described in reference to one origin of resources and are performed for the set of one or more JSON files representing resources of the origin.

At block 403, the collection manager obtains one or more JSON files representing resources of the origin. The manner by which the collection manager obtains the JSON files can depend on the trigger which was detected or satisfied at block 301. For instance, the collection manager can obtain the JSON files through submission of a request(s) to an application via an API exposed by the application for resources originating from an application. As another example, the JSON files can be obtained from input via a user interface. At block 404, the collection manager begins iterating through each of the JSON files representing a corresponding resource.

At block 405, the collection manager determines a category of the resource and corresponding JSON file based on the origin of the resource, type of the resource, and/or set of JSON object paths included in the JSON file. JSON files associated with resources within a category should have a shared set of possible JSON object paths. Categorization of resources based at least partly on origin thus provides for grouping of the resources by structure in terms of their JSON object paths and possible field-value pairs. The collection manager can determine the category of the resource based on an identifier(s) associated with the corresponding JSON file which identifies its origin, its type, or both its origin and type. The identifier(s) for the origin and/or type may have been provided in a response to the request to obtain the JSON files, provided at the time of input of the JSON files, etc. As another example, the collection manager may determine the category based on determining a set of JSON object paths for the JSON file and determining a resource model previously generated for a category of resources which includes the determined JSON object paths of the JSON file. The resulting category by which the resource is categorized may thus be based on the origin of the resource, the type of the resource, or a combination thereof.

At block 407, the collection manager associates the determined resource category with the corresponding JSON file. For instance, the collection manager may associate a label, tag, etc. with the JSON file which indicates the determined category.

At block 408, the collection manager determines if one or more JSON files obtained for the origin are remaining. If a JSON file(s) is remaining, operations continue at block 404. If no JSON files are remaining, operations continue at block 409.

At block 409, the collection manager determines a set of one or more possible JSON object paths corresponding to JSON files within categories associated with the origin. The collection manager can determine the possible JSON object paths for each category to which the obtained JSON files were assigned based on the obtained JSON files or a representative subset of the obtained JSON files within each category. For each category and associated JSON files, the collection manager can determine the JSON object paths based on parsing the JSON files from which the JSON object paths are being determined. For instance, the collection manager can replace a pair of curly brackets around JSON objects or sets of JSON objects with a period indicating a branch in the JSON object path based on generation and evaluation of a parse tree for the JSON files. In some cases, the JSON files can correspond to multiple JSON object paths, such as in instances where the JSON files comprises multiple paths and/or leaf objects. In such cases, the collection manager can also determine the tree structure of the JSON files and determine the multiple JSON object paths therein. For values at leaf nodes of the JSON files, the collection manager can determine an object type of the value (e.g., string, integer, Boolean) and indicate the type in place of the value in the JSON object path. The collection manager can determine the union of the determined JSON object paths, deduplicate the JSON object paths, and add the deduplicated JSON object paths to a resource model generated for the category. For instance, the resource model which is generated for each category may be a list which identifies the corresponding category. The determination of possible JSON object paths for resource categories associated with an origin may occur intermittently, such as after a configurable number of resource collection events for a particular origin to update the resource model for the respective category(ies), rather than as part of each collection event.

At block 411, the collection manager inserts the JSON files which have been categorized into the resource database. For instance, the collection manager can insert the JSON files into the resource database via an API that is exposed by the resource database. Entries in the resource database created for the respective resources may indicate the category of the resources (e.g., through labelling of entries, indexing of the resource database based on resource category, etc.).

At block 412, the collection manager determines whether one or more origins of resources are remaining for insertion of resources into the resource database. If an additional origin(s) of resources is remaining, operations continue at block 402. If there are no additional origins of resources remaining, operations are complete.

FIG. 5 is a flowchart of example operations for evaluating resource queries indicating one or more categories of resources. A resource query is evaluated as described herein upon submission of the resource query to a resource database, where the resource database maintains structured data representing resources which have been categorized based on their origin and/or type. As described in the example operations, the structured data representing resources can be JSON files.

At block 501, the query engine detects submission of a resource query which includes a JSON rule(s). The JSON rule(s) comprises at least a first indication of a category of resources to be queried. For instance, the resource query may include one JSON rule for one category of resources or more than one JSON rules for more than one corresponding categories of resources. The resource query may also specify an action to be taken for resources having associated JSON files comprising data which satisfy the JSON rule or to be taken upon a determination that the JSON rule has been satisfied (e.g., generation of a notification or alert).

At block 503, the query engine determines whether multiple resource categories are indicated in the resource query. Resource categories can be indicated in the resource query with keywords, identifiers, etc. which have been defined for resource categories. The query engine may parse the resource query and determine based on the parsing whether one resource category is indicated or whether two of more resource categories are indicated (e.g., based on the keyword(s), identifier(s), etc. identified based on the parsing). If multiple resource categories are indicated in the resource query, operations continue at block 505. If one resource category is indicated in the resource query, operations continue at block 511.

At block 505, the query engine generates a resource database query based on the resource query to query resources across the categories indicated in the resource query. Resource queries which indicate multiple resource categories may denote whether all, some, or one of the resource categories should be included in the results. As an example, for a resource query indicating categories X and Y of resources, the resource query can specify that resources having associated data which satisfy the query from both category X and Y or from one of categories X or Y should be shown in the results. An indication of which category or categories of resources should be returned in the results can also be included in the generated resource database query. The query engine can also parse the resource query to separate any join rules across resources from JSON rules corresponding to one category and determine one or more JSON object paths referenced in the query based on the parsing. The query engine can then generate a resource database query which indicates a name(s), identifier(s), etc. of each of the resource categories corresponding to the one or more JSON object paths in addition to the JSON object paths. For categories corresponding to cloud resources, the database interface can convert the determined JSON object path(s) into a cloud database query using an API for the cloud database as part of database query generation.

At block 507, the query engine queries the resource database based on the resource database query. The query engine submits the resource database query to the resource database and obtains results which can indicate the resources across the multiple categories which contributed to satisfaction of the query. In other examples, the results which are obtained can indicate the resources belonging to the specified category(ies).

At block 509, the query engine can associate resources of different categories indicated in results of the resource database query based on correlations between the resources. Resources having associated data which satisfy cross-category resource queries are correlated based on having at least a first value in common. For instance, two resources are correlated if a value at a JSON path for a first of the resources can be identified at a JSON path for a second of the resources (e.g., based on equivalence, being contained in an array, etc.). Correlations are not limited to two resources, and three or more resources can be correlated based on having values in common. For cases in which multiple categories of resources are to be shown in the results, the query engine can associate JSON files corresponding to the resources across categories that contributed to satisfaction of the query and are returned in the results. For instance, the query engine can at least partially join or merge the data included in JSON files corresponding to the resources across categories, create an association between the JSON files based on the value(s) by which the JSON files are correlated, etc.

At block 511, the query engine queries the resource database based on the resource query. The query engine may first generate a resource database query for submission to the resource database based on the resource query. For instance, the query engine can generate a resource database query which comprises one or more JSON object paths to be checked based on the JSON rule indicated in the resource query.

At block 513, the query engine indicates the results of the resource query. Indicating the results may include generating a notification, report, alert, etc. which identifies the resource(s) for which the data stored in the respective JSON file(s) satisfied the JSON rule included in the resource query. The resources which satisfied the resource query may belong to one category or may belong to multiple categories. For cases in which the results indicated multiple categories of resources, the indicated results can include the data of the resources indicated in the results which were associated with each other at block 509 based on the correlations between or among them.

At block 515, the query engine can create a rule or policy based on the JSON rule(s) for ongoing enforcement of the JSON rule(s). Whether the query engine should create rules or policies for JSON rules included in submitted resource queries may be a configurable setting of the query engine or may be included as a parameter of the resource query. The rule or policy which is created can indicate the JSON rule(s) and an action to be taken upon subsequent detection that resource data satisfy the rule or policy, such as generation of an alert or notification. The rule or policy can also indicate a condition which triggers its evaluation, such as completion of a collection event for resources categorized within the category or categories indicated in the rule or policy.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 404-408 can be performed in parallel or concurrently for each of the JSON files. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
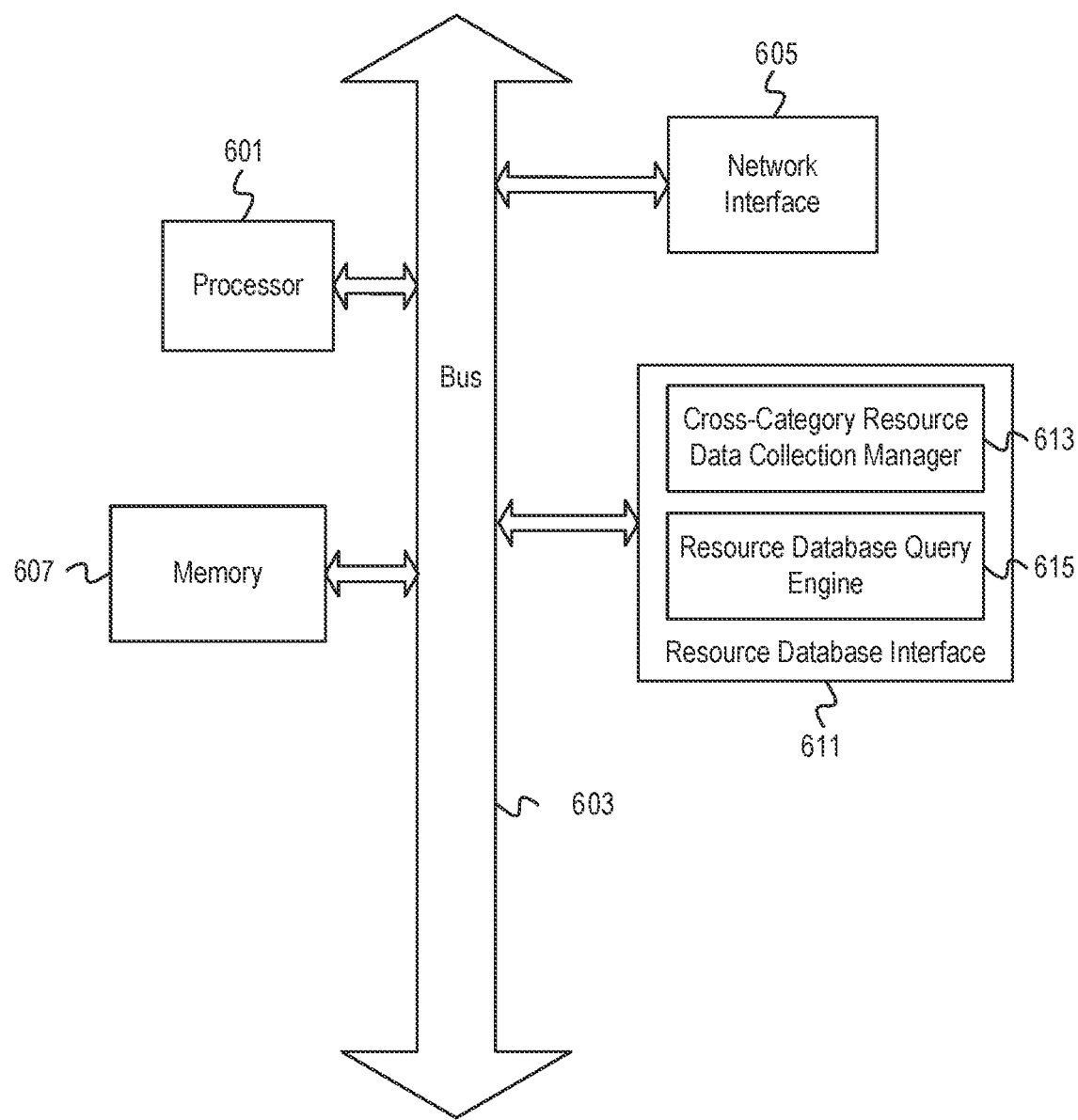
FIG. 6 depicts an example computer system with a resource database interface, cross-category resource data collection manager, and resource database query engine.

FIG. 6 depicts an example computer system with a resource database interface, cross-category resource data collection manager, and resource database query engine. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes resource database interface 611. The resource database interface 611 provides an interface for inserting structured data representing resources into and submitting queries to a resource database and includes cross-category resource data collection manager 613 and resource database query engine 615. The cross-category resource data collection manager 613 obtains and categorizes structured data representing resources based at least partly on the origin of the resources, where the resources can originate from multiple different sources. The resource database query engine 615 handles submitted resource queries, which can indicate one or more resource categories, and communicates the queries to a resource database for retrieval of structured data satisfying the submitted queries. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the preceding sufficiently describes example embodiments, language is somewhat constrained when describing innovations. Moreover, regional and national intellectual property (IP) offices have varying requirements. The following description and corresponding flowcharts attempt to disclose the technology in slightly different language in light of the constraints of language and myriad national/regional IP office requirements. The phrasing "executing program code" refers to program code executing with any of a myriad of executing implementations, such as a computer, security appliance, virtual machine, cloud-based service, etc.

Figure 7:
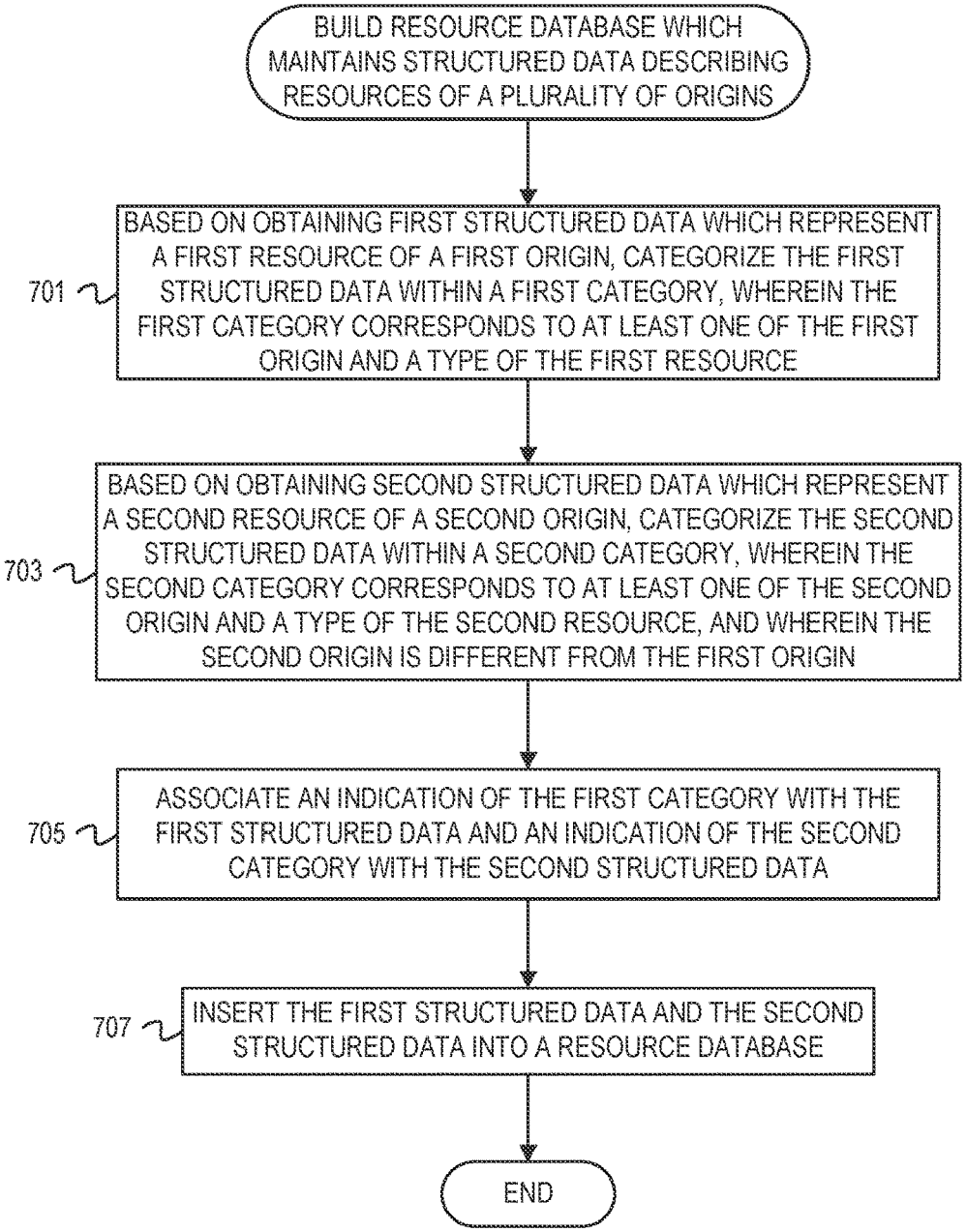
FIG. 7 is a flowchart of example operations for building a resource database which maintains structured data describing resources of a plurality of origins.

FIG. 7 is a flowchart of example operations for building a resource database which maintains structured data describing resources of a plurality of origins. At block 701, based on obtaining first structured data which represent a first resource of a first origin, executing program code categorizes the first structured data within a first category, wherein the first category corresponds to at least one of the first origin and a type of the first resource. At block 703, based on obtaining second structured data which represent a second resource of a second origin, executing program code categorizes the second structured data within a second category, wherein the second category corresponds to at least one of the second origin and a type of the second resource, and wherein the second origin is different from the first origin. At block 705, executing program code associates an indication of the first category with the first structured data and an indication of the second category with the second structured data. At block 707, executing program code inserts the first structured data and the second structured data into a resource database.

Figure 8:
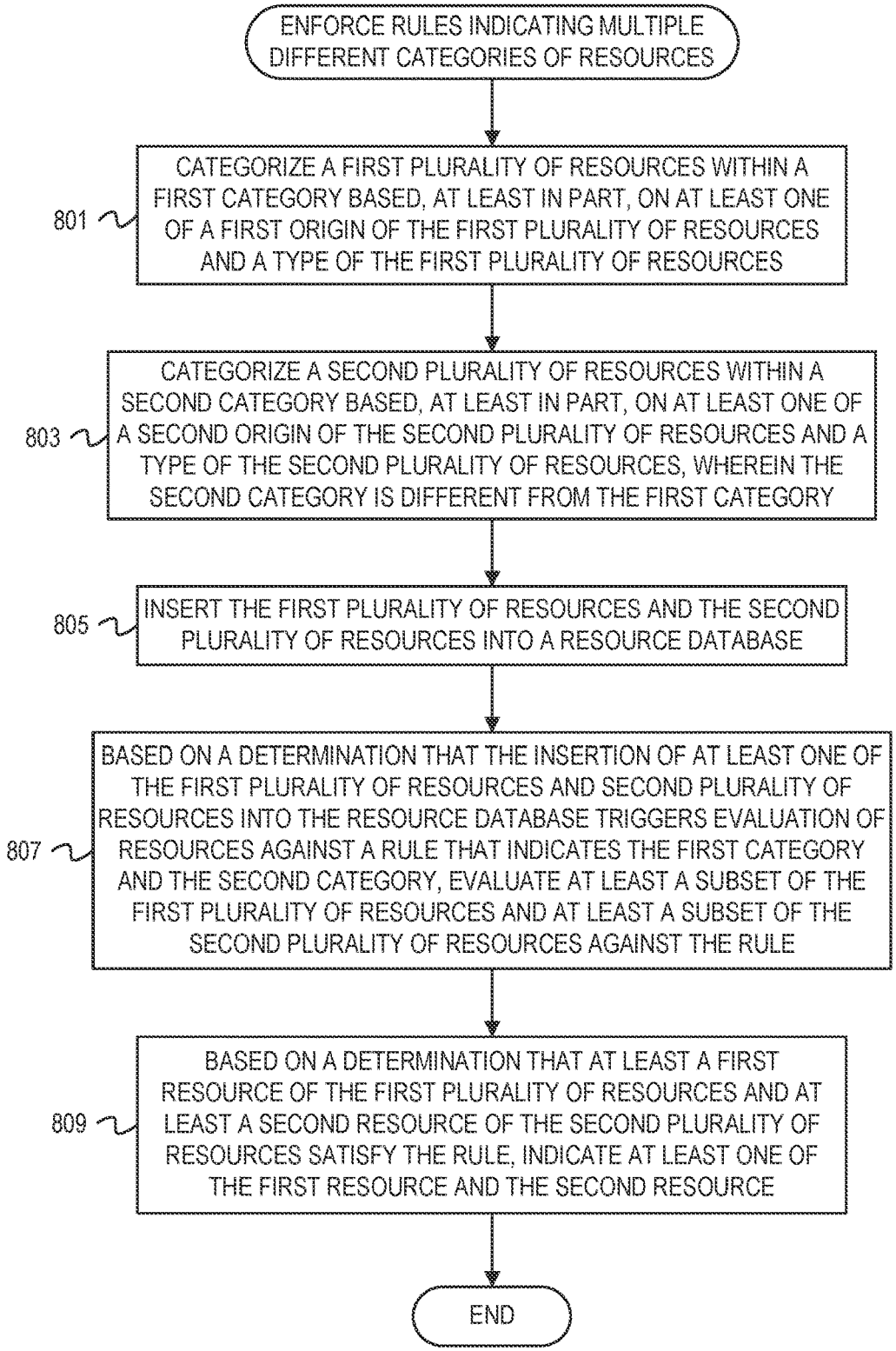
FIG. 8 is a flowchart of example operations for enforcing rules which indicate multiple different categories of resources.

FIG. 8 is a flowchart of example operations for enforcing rules which indicate multiple different categories of resources. At block 801, executing program code categorizes a first plurality of resources within a first category based, at least in part, on at least one of a first origin of the first plurality of resources and a type of the first plurality of resources. At block 803, executing program code categorizes a second plurality of resources within a second category based, at least in part, on at least one of a second origin of the second plurality of resources and a type of the second plurality of resources, wherein the second category is different from the first category. At block 805, executing program code inserts the first plurality of resources and the second plurality of resources into a resource database. At block 807, based on a determination that the insertion of at least one of the first plurality of resources and second plurality of resources into the resource database triggers evaluation of resources against a rule that indicates the first category and the second category, executing program code evaluates at least a subset of the first plurality of resources and at least a subset of the second plurality of resources against the rule. At block 809, based on a determination that at least a first resource of the first plurality of resources and at least a second resource of the second plurality of resources satisfy the rule, executing program code indicates at least one of the first resource and the second resource.

Figure 9:
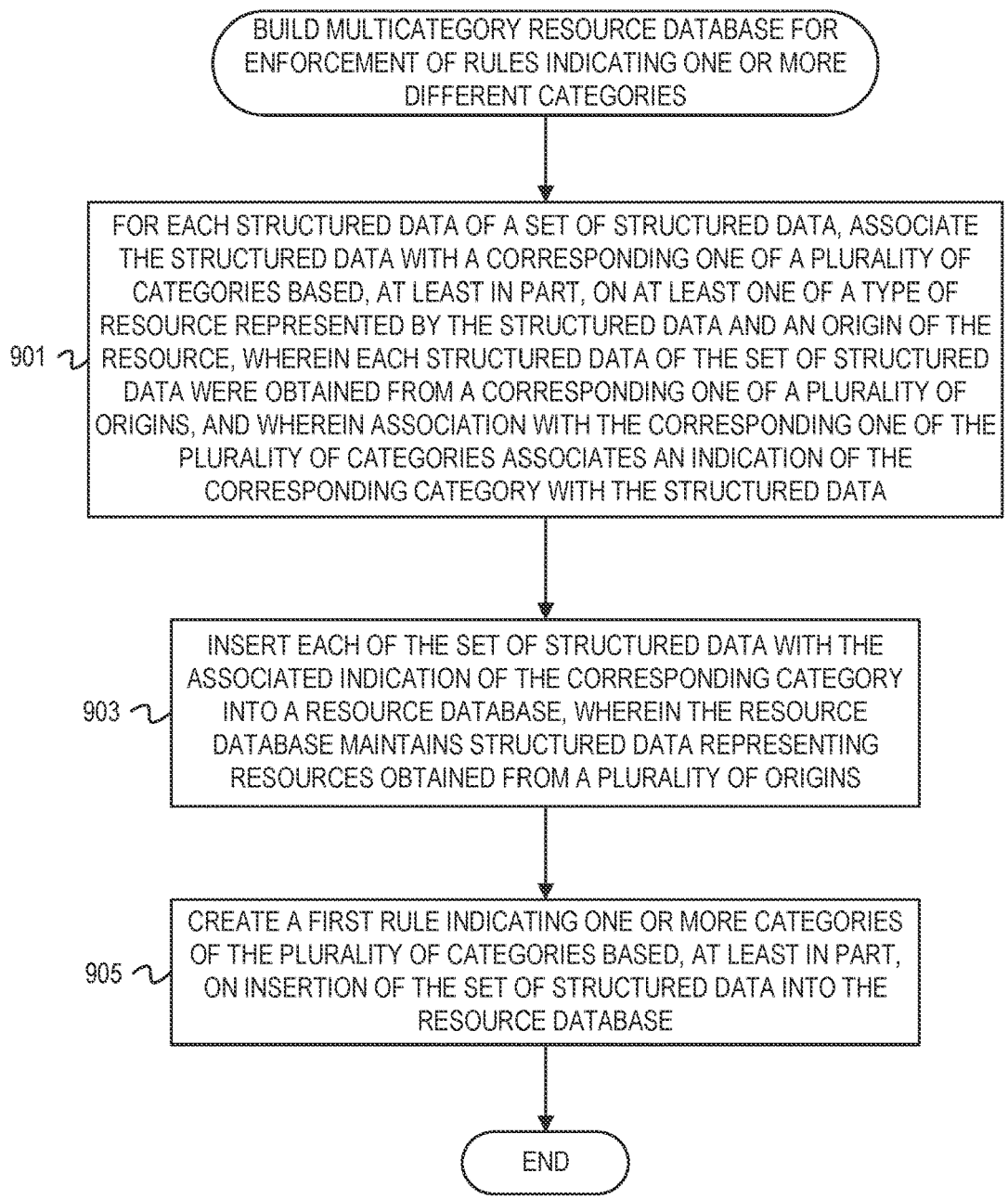
FIG. 9 is a flowchart of example operations for building a multicategory resource database for enforcement of rules indicating one or more different resource categories.

FIG. 9 is a flowchart of example operations for building a multicategory resource database for enforcement of rules indicating one or more different resource categories. At block 901, for each structured data of a set of structured data, executing program code associates the structured data with a corresponding one of a plurality of categories based, at least in part, on at least one of a type of resource represented by the structured data and an origin of the resource, wherein each structured data of the set of structured data were obtained from a corresponding one of a plurality of origins, and wherein association with the corresponding one of the plurality of categories associates an indication of the corresponding category with the structured data. At block 903, executing program code inserts each of the set of structured data with the associated indication of the corresponding category into a resource database, wherein the resource database maintains structured data representing resources obtained from a plurality of origins. At block 905, executing program code creates a first rule indicating one or more categories of the plurality of categories based, at least in part, on insertion of the set of structured data into the resource database.

While the aspects of the disclosure are described with reference to various implementations and exploitations, it will be understood that these aspects are illustrative and that the scope of the claims is not limited to them. In general, techniques for domain-independent resource security and management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   based on obtaining first structured data which represent a first resource of a first origin, categorizing the first structured data within a first category,
      wherein the first category corresponds to at least one of the first origin and a type of the first resource;
   based on obtaining second structured data which represent a second resource of a second origin, categorizing the second structured data within a second category,
      wherein the second category corresponds to at least one of the second origin and a type of the second resource,
      wherein the second origin is different from the first origin;
   associating an indication of the first category with the first structured data and an indication of the second category with the second structured data; and
   inserting the first structured data and the second structured data into a resource database.

2. The method of claim 1, wherein the first resource comprises a Software-as-a-Service (SaaS) application resource, an on-premise application resource, or a cloud resource.

3. The method of claim 1, wherein the first origin comprises a SaaS application, an on-premise application, or a cloud environment.

4. The method of claim 1,
   wherein obtaining the first structured data comprises submitting a request to the first origin via an application programming interface (API) of the first origin or obtaining the first structured data from input, and wherein obtaining the second structured data comprises submitting a request to the second origin via an API of the second origin or obtaining the second structured data from input.

5. The method of claim 1 further comprising, determining that a first rule for structured data which identifies the first category has been created;

based on obtaining third structured data which represents a third resource of the first origin and categorizing the third structured data within the first category, determining if the third structured data satisfy the first rule; and based on determining that the third structured data satisfy the first rule, generating a notification that indicates satisfaction of the first rule, wherein the notification identifies the third resource.

6. The method of claim 1, further comprising:

generating a first model of resources belonging to the first category based, at least in part, on a syntactic structure of the first structured data; and generating a second model of resources belonging to the second category based, at least in part, on a syntactic structure of the second structured data.

7. The method of claim 6, wherein generating the first model and the second model comprises, based on parsing the first structured data and the second structured data, generating representations of syntactic structures of the first structured data and the second structured data;

determining a first plurality of object paths for resources belonging to the first category based, at least in part, on the syntactic structure of the first structured data, wherein the first model comprises the first plurality of object paths; and determining a second plurality of object paths for resources belonging to the second category based, at least in part, on the syntactic structure of the second structured data, wherein the second model comprises the second plurality of object paths.

8. The method of claim 1, wherein the first structured data comprise a first JavaScript Object Notation (JSON) file, and wherein the second structured data comprise a second JSON file.

9. One or more non-transitory machine-readable media comprising program code to:

categorize a first plurality of resources within a first category based, at least in part, on at least one of a first origin of the first plurality of resources and a type of the first plurality of resources;

categorize a second plurality of resources within a second category based, at least in part, on at least one of a second origin of the second plurality of resources and a type of the second plurality of resources, wherein the second category is different from the first category;

insert the first plurality of resources and the second plurality of resources into a resource database;

based on a determination that the insertion of at least one of the first plurality of resources and second plurality of resources into the resource database triggers evaluation of resources against a rule that indicates the first category and the second category, evaluate at least a subset of the first plurality of resources and at least a subset of the second plurality of resources against the rule; and based on a determination that at least a first resource of the first plurality of resources and at least a second resource of the second plurality of resources satisfy the rule, indicate at least one of the first resource and the second resource.

10. The non-transitory machine-readable media of claim 9, wherein the first plurality of resources comprises a first plurality of JavaScript Object Notation (JSON) files, wherein the second plurality of resources comprises a second plurality of JSON files, and wherein the rule comprises a rule for structured data represented with JSON.

11. The non-transitory machine-readable media of claim 10, wherein the program code to determine that the first resource and the second resource satisfy the rule comprises program code to determine that the first resource and the second resource are correlated based, at least in part, on identification of a value in common at a first JSON object path of the first resource and a second JSON object path of the second resource.

12. The non-transitory machine-readable media of claim 9 further comprising program code to create a joined or merged representation of the first resource and the second resource, wherein the program code to indicate the at least one of the first resource and the second resource comprises program code to indicate the joined or merged representation of the first resource and the second resource.

13. The non-transitory machine-readable media of claim 9, wherein the program code to categorize the first plurality of resources within the first category comprises program code to associate an indication of the first category with each of the first plurality of resources, and wherein the program code to categorize the second plurality of resources within the second category comprises program code to associate an indication of the second category with each of the second plurality of resources.

14. An apparatus comprising:

a processor; and a computer-readable medium having instructions stored thereon that are executable by the processor to cause the apparatus to, for each structured data of a set of structured data, associate the structured data with a corresponding one of a plurality of categories based, at least in part, on at least one of a type of resource represented by the structured data and an origin of the resource, wherein each structured data of the set of structured data were obtained from a corresponding one of a plurality of origins, wherein association with the corresponding one of the plurality of categories associates an indication of the corresponding category with the structured data;

insert each of the set of structured data with the associated indication of the corresponding category into a resource database, wherein the resource database maintains structured data representing resources obtained from a plurality of origins; and create a first rule indicating one or more categories of the plurality of categories based, at least in part, on insertion of the set of structured data into the resource database.

15. The apparatus of claim 14, wherein the plurality of origins comprises at least one of a plurality of Software-as-a-Service (SaaS) applications, a plurality of on-premise applications, and a plurality of cloud environments.

16. The apparatus of claim 14 further comprising instructions executable by the processor to cause the apparatus to, based on a determination that a trigger for evaluation of the first rule has been satisfied, for each of the one or more categories, evaluate corresponding structured data of set of structured data associated with the category against the first rule; and based on a determination that a first subset of the set of structured data satisfy the first rule, indicate the first subset of the set of structured data.

17. The apparatus of claim 16, wherein the instructions executable by the processor to cause the apparatus to indicate the first subset of the set of structured data comprise instructions executable by the processor to cause the apparatus to generate a report or notification which indicates the first subset of the set of structured data.

18. The apparatus of claim 14, further comprising instructions executable by the processor to cause the apparatus to, for each category of the plurality of categories and corresponding subset of the set of structured data associated with the category, generate a model for structured data of the category, wherein the model comprises one or more object paths present among the subset of the set of structured data.

19. The apparatus of claim 18, wherein the instructions executable by the processor to cause the apparatus to generate the model comprise instructions executable by the processor to cause the apparatus to, determine syntactic structure of the subset of the set of structured data based, at least in part, on parsing each of the subset of the set of structured data;

determine one or more object paths based on the syntactic structure of the subset of the set of structured data; and deduplicate the one or more object paths, wherein the model is generated based on the deduplicated one or more object paths.

20. The apparatus of claim 14, further comprising program code executable by the processor to obtain a plurality of JavaScript Object Notation (JSON) files from corresponding ones of the plurality of origins, wherein the set of structured data comprise the plurality of JSON files, and wherein the first rule comprises a rule for structured data formatted with JSON.

* * * * *